3,235,560
1-SUBSTITUTED 1,3-IMIDAZOLINES AND
METHOD OF PREPARING SAME
Frederick S. Kaveggia, Los Angeles, and Isidore Pollack,
Westminster, Calif., assignors to Purex Corporation,
Ltd., Lakewood, Calif., a corporation of California
No Drawing. Filed July 3, 1962, Ser. No. 207,414
7 Claims. (Cl. 260—309.6)

This invention relates to a novel group of compounds, and is particularly concerned with a novel group of compounds, containing the imidazoline ring, which have useful, e.g., fluorescent properties, and to a method of preparation of these compounds.

Fluorescent dyes and chemicals are now widely used in many arts. Thus, for example, fluorescent dyes are employed as textile dyes and are also used in inks, paints, pigments, dye penetrants for inspection of the surface of objects to detect cracks and flaws therein, and for coloring of metals. For some applications, the fluorescent dyes are required to be water soluble, while for others the dyes must be substantially insoluble in water and soluble in organic solvents. The most valuable types of fluorescent dyes are those which exhibit a bright fluorescence within the visible spectrum when excited by light of the proper wave length, e.g., ultraviolet or so-called "black light."

It is accordingly an object of the invention to provide a novel class of compounds, certain of which possess fluorescent characteristics.

Another object is the provision of a class of compounds having one or more functional, e.g., hydroxy groups, and capable of further reaction.

A particular object of the invention is the provision of a group of novel compounds characterized by the presence therein of an imidazoline ring and exhibiting bright fluorescence.

Still another object is to afford novel fluorescent dyes, certain of which are soluble in organic solvents, having a bright, e.g., yellow to green, fluorescent emission within the visible spectrum.

Yet another object is the provision of procedure for producing the compounds of the invention.

We have unexpectedly found that by reacting at relatively high temperature a 1-hydroxyalkyl glyoxalidine with a tricarboxylated compound of the group consisting of citric acid, aconitic acid, tricarballylic acid, and esters thereof, an esterification reaction occurs between the carboxylic acid groups or the ester groups of the tricarboxylated compound, and the hydroxy group of the above substituted glyoxalidine, resulting in a novel and valuable class of compounds. Certain preferred embodiments of such compounds exhibit bright fluorescence when excited by ultraviolet light.

The compounds produced according to the invention are 1-substituted 1,3-imidazolines of the general type represented by the formula:

(I)
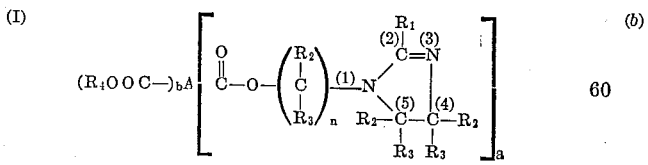

wherein A is a member of the group consisting of a decarboxylated citric acid radical, a decarboxylated aconitic acid radical, and a decarboxylated tricarballylic acid radical, $R_2$ and $R_3$ are each hydrogen, an alkyl radical, e.g., containing from 1 to about 22, preferably about 1 to about 12, carbon atoms, such as methyl, ethyl, propyl, isopropyl, butyl, amyl, octyl, nonyl, decyl, undecyl, duodecyl, and the like, and including cycloalkyl, e.g., cyclopentyl, cyclohexyl, and the like; an aryl radical either monocyclic or polycyclic, such as phenyl, naphthyl, and the like; or alkaryl or aralkyl, such as methyl, phenyl, tolyl, phenyl ethyl, and the like; and wherein said alkyl, aryl, alkaryl and aralkyl substituents can be further substituted, e.g., by sulfonic acid groups, hydroxy groups, and the like, and wherein $R_2$ and $R_3$ may be the same or different; $R_1$ can be the same as $R_2$ and $R_3$ defined above, and also can include the alkenyl radical, e.g., containing up to about 20 carbon atoms, such as ethenyl, propenyl, butenyl, decenyl, heptadecenyl, and the like, and $R_4$ is hydrogen or an alkyl radical, e.g., methyl, ethyl, propyl, butyl and the like; $n$ is an integer from 1 to 5, preferably 2; $a$ is an integer from 1 to 3, preferably 3, and $b$ is equal to $3-a$.

The compounds produced according to the invention are preferably of the general type represented by the formula:

(II)
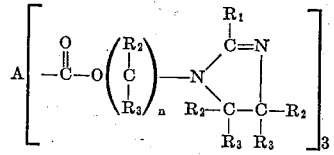

where A, $n$, $R_1$, $R_2$ and $R_3$ are as defined above.

The most desirable compounds according to the invention are those wherein $R_2$ and $R_3$ are each hydrogen, and $n$ is 2, such compounds having the general formula (III)
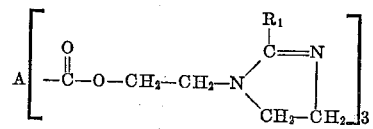

where A and $R_1$ are as defined above.

The following are some specific examples of novel compounds according to the invention.

(a)
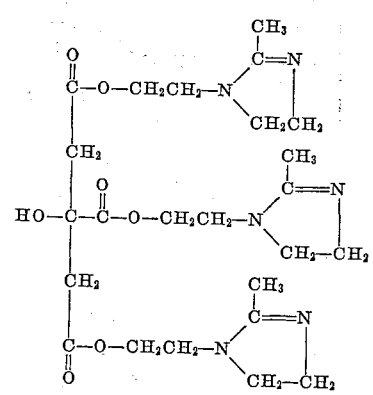

(b)
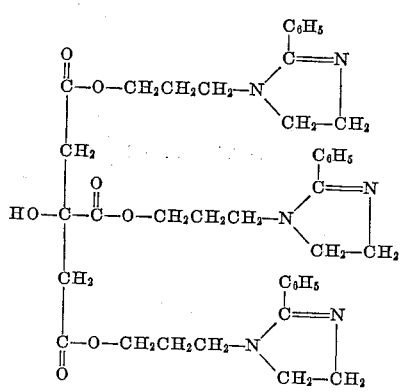

(c) 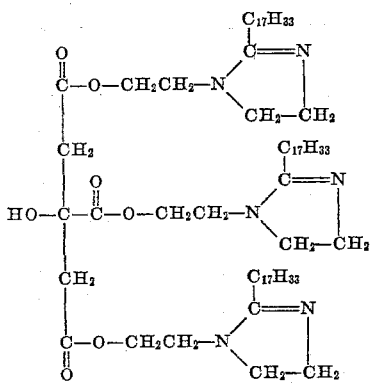

(d) 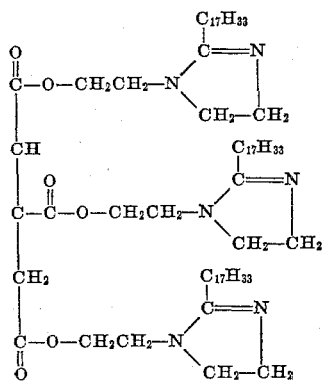

(e) 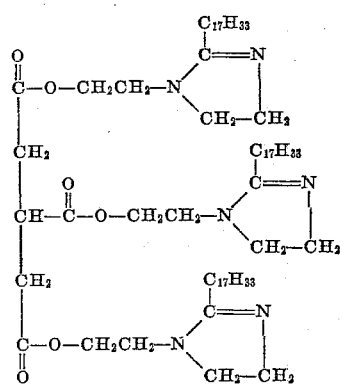

(f) 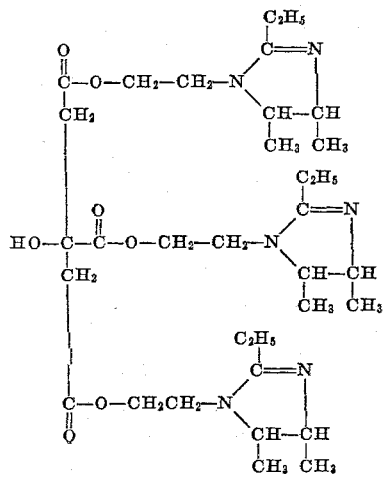

(g) 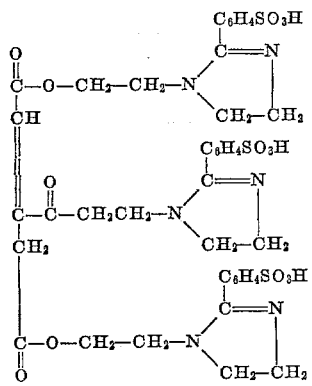

(h) 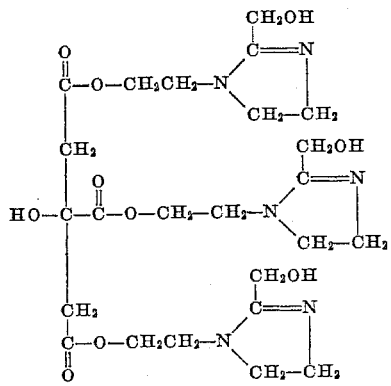

(i) 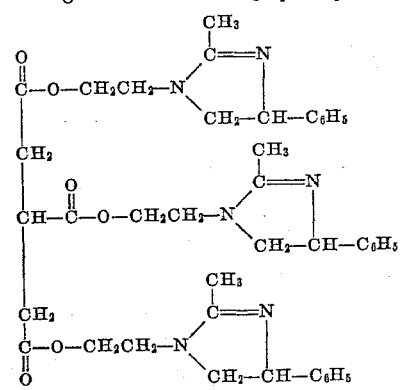

The 1-hydroxyalkyl glyoxalidine compounds which can be reacted with the above tricarboxylated compound for producing the compounds hereof have the general formula (IV) 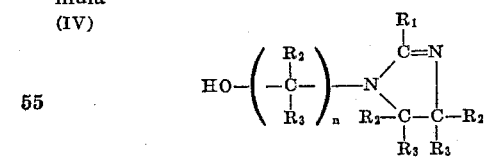

when $n$, $R_1$, $R_2$ and $R_3$ have the values above defined, preferably when $n$ is 2, and $R_2$ and $R_3$ are each hydrogen.

Examples of such glyoxalidine compounds are 1-hydroxyethyl 2-methyl glyoxalidine, 1-hydroxypropyl 2-phenyl glyoxalidine, 1-hydroxybutyl 2-ethyl glyoxalidine, 1-hydroxyethyl 2-heptadecenyl glyoxalidine, 1-hydroxyethyl 2-ethyl 4,5-dimethyl glyoxalidine, 1-hydroxyethyl 2-(benzene sulfonic acid) glyoxalidine, 1-hydroxyethyl 2-hydroxymethyl glyoxalidine, 1-hydroxyethyl 2-methyl 4-phenyl glyoxalidine.

As the tricarboxylated reactant, the tricarboxylic acids, citric acid, aconitric acid, tricarballylic acid, or their substituted derivatives are suitable. Substituted citric, aconitic or tricarballylic acids which can be employed may be, for example, the alkyl, e.g., methyl, ethyl, propyl, and the like, derivatives, and the aryl, e.g., phenyl and naphthyl, derivatives of citric acid, aconitic acid, and tricarballylic acid.

The esters, e.g., the alkyl esters, of citric acid, of aconitic acid, of tricarballylic acid, or their substituted derivatives, may also be employed. These are generally in the form of triesters, although mixed acid-esters may be employed such as the diesters of citric, aconitic, and tricarballylic acids. Thus, for example, triethyl citrate, triethyl aconitate or triethyl carballylate can be employed, and diethyl citrate, diethyl aconitate and diethyl carballylate may also be suitable. The corresponding methyl, propyl and butyl esters can also be used. Substituted citric, aconitic, or tricarballylic acid esters which may be employed include the alkyl, e.g., methyl, ethyl, propyl, and the like, derivatives, and the aryl, e.g., phenyl and naphthyl derivatives, of citric acid ester, aconitic acid ester, or tricarballylic acid ester.

The terms "a citric acid," "a citric acid ester," "an aconitic acid," "an aconitic acid ester," "a tricarballylic acid" and "a tricarballylic acid ester," as employed herein, are intended to denote either the unsubstituted or the substituted acids and esters. The preferred tricarboxylated compounds employed for reaction with the glyoxalidine compound hereof are the unsubstituted citric acid, aconitic acid, and tricarballylic acid, and their unsubstituted triesters.

The reaction between the glyoxalidine compound and the tricarboxylated compound can be carried out by forming a mixture of the glyoxalidine and the tricarboxylic acid or ester in the desired molar proportions, as described more fully below. The mixture is then stirred while low heat is applied over a period of, say, 15 to 20 minutes, to form a melt. When a completely homogeneous melt is obtained, the application of heat is increased and the melt is rapidly heated to temperature in the range of about 300° to about 400° F., e.g., about 350° to about 375° F., until frothing occurs. The reaction mixture is further heated and maintained at temperatures in the above ranges for a period, e.g., about 10 to 20 minutes, until frothing ceases, indicating completion of the reaction. Water or alcohol is formed as a result of the esterification reaction which occurs.

When the reaction is completed, the reaction product is purified and separated from the reaction mixture by extracting the reaction mixture, preferably with a solvent for the excess glyoxalidine and in which the reaction product is insoluble, e.g., water, isopropyl alcohol or benzene, depending on the particular glyoxalidine compound used, thus forming a solvent solution containing the excess glyoxalidine, and removing such solvent solution, e.g., by decantation from the reaction mixture. The insoluble portion, e.g., containing water and residual solvent, if a solvent other than water is employed, is then heated to evaporate water and such remaining solvent, and the residue comprising reaction product is then dried.

As an alternative to the above purification procedure, a solvent can be used in which the reaction product is soluble and in which the excess glyoxalidine compound is insoluble, thus extracting a solvent solution of the product, and removing the solvent by distillation to recover the product.

Alternatively, the above-described solvent extractions can be omitted, and instead the reaction mixture can be subjected to vacuum distillation to drive off the excess glyoxalidine and water of reaction, or alcohol, if present, followed by drying the reaction product residue.

The reaction products of the invention may be soluble in water in some instances and soluble in organic solvents in other instances. Where, for example, $R_1$, $R_2$ and/or $R_3$ is an aromatic radical, e.g., phenyl, or is a relatively long chain alkyl radical, or $R_1$ is a relatively long chain alkenyl radical, e.g., wherein said alkyl or alkenyl radical contains about 4 or more carbon atoms, the resulting compound may be soluble in organic solvents such as aromatic hydrocarbons, e.g., benzene or xylene, and insoluble in water. Where $R_1$, $R_2$ and $R_3$ are hydrogen or short chain alkyl radicals, or where $R_1$ is a short chain alkenyl radical, said alkyl or alkenyl radical containing say 1 to about 3 carbon atoms, the resulting compounds may be water soluble.

The compounds of the invention are produced employing a molar proportion of at least 1 mol of the glyoxalidine compound per mol of the tricarboxylated compound. The preferred products, having the general Formula II or III above, are prepared by employing in the condensation reaction at least 6, and usually between 6 and 8, mols of the glyoxalidine per 2 mols of a citric acid, an aconitic acid, or tricarballylic acid, or their respective esters (i.e., at least a 3:1 molar ratio of glyoxalidine to such tricarboxylated compounds). Molar proportions of glyoxalidine compound greater than 8 mols, e.g., up to 14 mols, per 2 mols of a citric acid, an aconitic acid, or a tricarballylic acid compound, or their esters, can be employed to produce preferred compounds having the structure of Formula II or III above, except that use of such large amounts is unnecessary and requires removal of the excess glyoxalidine from the reaction mixture.

Although preferred compounds are prepared by reacting the glyoxalidine compound and a citric acid, an aconitic acid, or a tricarballylic acid or their esters, in a molar proportion of from 3 to 4 mols of the glyoxalidine per mol of the acid or ester, useful compounds may be prepared employing a molar proportion of less than 3, e.g., from 1 to about 2.5 mols of glyoxalidine compound per mol of the acid or ester. Employing the above less preferred lower molar proportions of glyoxalidine to tricarboxylated compound, products are formed which, although not having the preferred structure illustrated in Formula II or III, have at least one ester group containing a 1-oxyalkyl imidazoline ring, according to the general Formula I above, e.g., one or two such ester groups, depending upon the amount of glyoxalidine compound employed. These reaction products are also contemplated within the purview of the invention.

Certain of the invention compounds emit fluorescent light in the visible region of the spectrum when either the solid product or a solution thereof is subjected to an activating or exciting wave length of light, usually in the invisible portion of the spectrum, by irradiation with "black light" or ultraviolet light.

The fluorescent compounds or fluorescent dyes which can be produced according to the invention may be used to color cotton or nylon. Thus, for example, such compounds, e.g., compound (b) above, can be sulfonated, e.g., on the aromatic nucleus, or a sulfonated reaction product formed from a sulfonated aromatic reactant, such as a sulfonated aryl-substituted glyoxalidine, e.g., compound (g) above. The provision of a sulfonated reaction product may render the dye substantive to cotton. In weakly acid baths, e.g., aqueous acetic or boric acid solutions, the fluorescent dyes which can be produced according to the invention may be substantive to and be exhausted on nylon and acrilan.

Further, the fluorescent dyes of the invention may be employed in formulations useful for leak detection, in dye penetrants for detection of flaws in surfaces of bodies, in paints, and the like.

Certain of the compounds produced according to the invention, and containing functional groups, e.g., hydroxy groups, such as the compounds formed employing citric acid (see compounds (a), (b), (c), (f), and (h) above), and compounds such as (h) containing hydroxy groups carried on the imidazoline ring, may serve as intermediates for further reaction or coupling with other compounds to produce useful dyes or compounds having other uses, e.g., as pharmaceuticals.

The following are examples of preparation of the compounds or dyes of the invention, and their application.

*Example 1*

105 grams (0.3 gm.-mole) of 1-hydroxyethyl 2-heptadecenylglyoxalidine (marketed as "amine 220" by the Union Carbide Chemical Co.) was mixed with 19.2 grams of citric acid (0.1 gm.-mol). This mixture was heated until a uniform melt was obtained, then the reaction temperature was raised to 360° F. After frothing ceased, the melt was heated an additional 10 minutes. The reaction product was purified of excess glyoxalidine compound by extraction with water to remove excess glyoxalidine compound. The resulting resin-like products, compound (c), was completely water-insoluble but had solubility in such solvents as xylene and benzene, and exhibited in such solution an intense greenish-yellow fluorescence when excited by ultraviolet light. The solid product exhibited a green fluorescence when irradiated by ultraviolet light.

*Example 2*

The procedure of Example 1 is repeated employing in place of the glyoxalidine compound thereof, 0.3 gm.-mol of 1-hydroxyethyl 2-methyl glyoxalidine, and reaction temperatures between 300° and 400° F. A compound having the structure of compound (a) above is thereby obtainable.

*Example 3*

The procedure of Example 1 is repeated employing in place of citric acid, 0.1 gm.-mol of aconitric acid. A compound having the structure of compound (d) above is thereby obtainable.

*Example 4*

The procedure of Example 1 is substantially followed, employing in place of the glyoxalidine compound thereof, each of the following glyoxalidine compounds in the same molar proposition of about 3 mols of the glyoxalidine compound per mol of citric acid as in Example 1, and carrying out the reaction at temperature varying from about 300° to about 400° F.

1-hydroxypropyl 2-phenyl glyoxalidine
1-hydroxyethyl 2-ethyl, 4,5-dimethyl glyoxalidine
1-hydroxyethyl 2-(benzene sulfonic acid) glyoxalidine
1-hydroxyethyl 2-hydroxymethyl glyoxalidine
1-hydroxyethyl 2-methyl, 4-phenyl glyoxalidine

*Example 5*

The procedure of Example 1 is repeated, employing a molar proportion of about 3.5 mols of the glyoxalidine compound per mol of citric acid.

*Example 6*

The procedure of Example 1 is repeated, except employing a mol ratio of 2 mols of the glyoxalidine compound thereof per mol of citric acid.

*Example 7*

The procedure of Example 1 is substantially repeated, employing in place of citric acid, triethyl citrate in a molar proportion of 3 mols of the glyoxalidine compound thereof to 1 mol of triethyl citrate, at temperatures between 300° and 400° F. A reaction product having the structure of Formula c above is obtained.

*Example 8*

The procedure of Example 1 is repeated, employing tricarballylic acid instead of citric acid, in the same molar amount. The product thereby obtainable in represented by Formula e above.

*Example 9*

The fluorescent dye of Formula c above may be employed for coloring nylon by first forming a treating bath having the following composition:

| | Percent by weight |
|---|---|
| Nacconol NRSF (sodium alkylaryl sulfonate having an average of 12 carbon atoms in the alkyl chain) | 0.1 |
| Fluorescent dye, compound (c) | 0.1 |
| Water | 99.8 |
| | 100.0 |

The pH of the bath is adjusted to about 3.0 with formic acid, and nylon cloth is immersed in the bath maintained at about 140° F., for 10 minutes. It is then thoroughly rinsed and dried. The treatment imparts to the nylon cloth a green fluorescence under black light.

While we have described particular embodiments of our invention for purposes of illustration, it should be understood that various modifications and adaptations thereof may be made within the spirit of the invention, as set forth in the appended claims.

We claim:

1. The process which comprises heating a mixture consisting essentially of a 1-hydroxyalkyl glyoxalidine having the formula

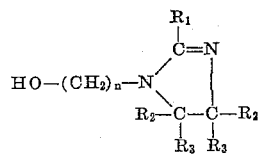

wherein $R_1$ is a member selected from the class consisting of hydrogen, alkyl of from 1 to 22 carbon atoms, aryl and alkenyl of up to 20 carbon atoms, $R_2$ and $R_3$ are each a member selected from the class consisting of hydrogen, alkyl of from 1 to 22 carbon atoms and aryl, and $n$ is an integer of from 1 to 5, with a tricarboxylated compound selected from the group consisting of citric acid, tricarballylic acid, and the lower alkyl esters thereof, in a molar ratio of at least 3 mols of the glyoxalidine per mol of the tricarboxylated compound, to form a melt, raising the temperature of the mixture in the range of about 300° to 400° F. until frothing occurs, and maintaining the temperature in the aforementioned temperature range for a period until frothing ceases, indicating completion of the reaction, and recovering the reaction product.

2. The process as defined in claim 1 wherein said glyoxalidine is 1-hydroxyethyl 2-heptadecenyl glyoxalidine.

3. The process which comprises heating a mixture consisting essentially of 1-hydroxyethyl 2-heptadecenyl glyoxalidine and citric acid in a molar ratio of the glyoxalidine to the acid of from about 3:1 to about 4:1, continuing to form a melt, heating the reaction mixture at elevated temperature between about 300° and about 400° F. until frothing occurs, the reaction in the aforementioned temperature range until frothing of the reaction mixture substantially ceases, removing any excess glyoxalidine from the reaction mixture, and recovering the reaction product.

4. A compound having the formula:

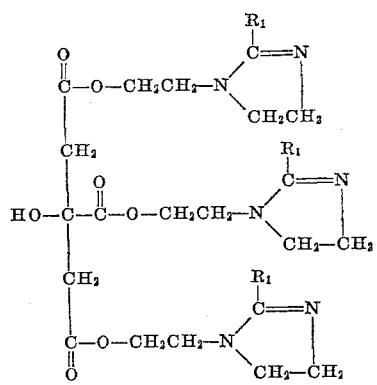

where $R_1$ is alkenyl of up to 20 carbon atoms.

5. A compound having the formula:

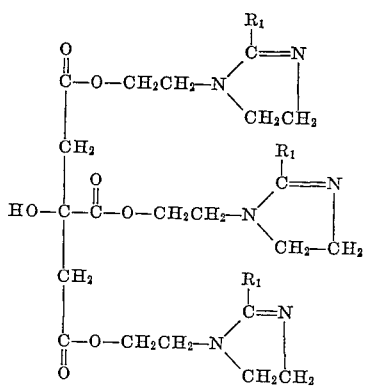

where $R_1$ is alkyl of from 1 to 12 carbon atoms.

6. A compound having the formula:

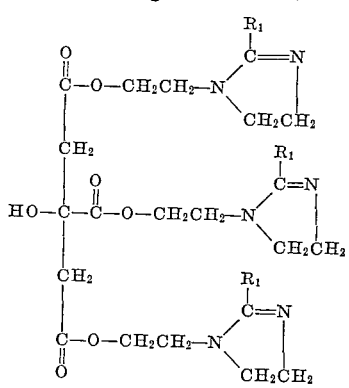

where $R_1$ is aryl.

7. A compound having the formula:

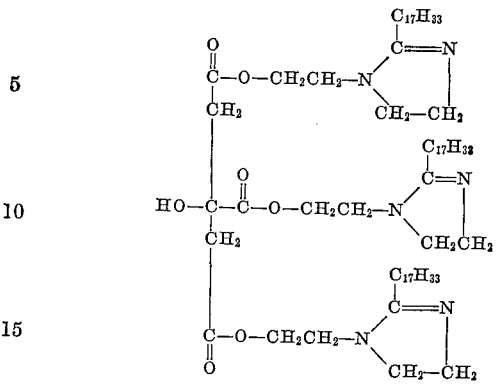

References Cited by the Examiner
UNITED STATES PATENTS

| | | | |
|---|---|---|---|
| 2,118,432 | 5/1938 | Gessler | 8—76 |
| 2,865,927 | 12/1958 | Cain | 260—309.6 |
| 2,899,441 | 8/1959 | Dornfeld | 260—309.6 |
| 2,940,816 | 6/1960 | Sniegowski | 8—76 |
| 2,945,821 | 7/1960 | Sterlin | 260—309.6 |
| 2,987,514 | 6/1961 | Hughes et al. | 260—309.6 |
| 3,029,236 | 4/1962 | Staeuble et al. | 260—249.5 |
| 3,078,136 | 2/1963 | Trosken et al. | 8—54.2 |

OTHER REFERENCES

Shriner et al: The Systematic Identification of Organic Compounds, 3rd ed., pp. 3–16, N.Y., Wiley, 1948.

WALTER A. MODANCE, *Primary Examiner.*

IRVING MARCUS, JOHN D. RANDOLPH, *Examiners.*

NATALIE TROUSOF, *Assistant Examiner.*